United States Patent [19]

Georgiades

[11] Patent Number: 5,670,831
[45] Date of Patent: Sep. 23, 1997

[54] VEHICLE IGNITION SYSTEM CAPABLE OF CONTINUED ENGINE RUNNING AFTER REMOVAL OF IGNITION KEY

[76] Inventor: Demetrios Georgiades, 44 Archer House, Vicarage Crescent, London SW11 3LF, England

[21] Appl. No.: 571,289

[22] Filed: Dec. 12, 1995

[30] Foreign Application Priority Data

Dec. 13, 1994 [GB] United Kingdom ............... 9425383

[51] Int. Cl.⁶ ....................................... B60R 25/00
[52] U.S. Cl. ................. 307/10.3; 180/287; 307/10.6
[58] Field of Search ........................ 307/9.1–10.6; 180/287; 123/198 DC, 198 DB, 630, 198 D; 340/425.5, 426, 825.31–825.32, 825.69, 825.72

[56] References Cited

U.S. PATENT DOCUMENTS

| | | |
|---|---|---|
| 3,582,668 | 6/1971 | Kawase ............... 340/425.5 |
| 3,680,539 | 8/1972 | Savage et al. ............. 123/198 DB |
| 4,088,110 | 5/1978 | Sperline ............. 123/198 DB |
| 4,120,278 | 10/1978 | Ward ..................... 123/198 D |
| 4,403,675 | 9/1983 | Cardwell ................. 180/287 |
| 4,754,838 | 7/1988 | Cody ..................... 180/287 |
| 5,115,145 | 5/1992 | Westberg et al. ............. 307/10.2 |
| 5,180,924 | 1/1993 | Rudisel ................. 307/10.6 |

Primary Examiner—Richard T. Elms
Attorney, Agent, or Firm—Kinney & Lange, P.A.

[57] ABSTRACT

A vehicle ignition system comprises a key cylinder and a key arranged such that the vehicle can be put in a state in which the key is removed from the cylinder leaving the engine running. The system includes a first safety check system which prevents operation to said state unless one or more of a first set of safeguard conditions is met. A timer is arranged to be automatically started to measure a predetermined time delay from removal of the key when the engine is running, and a second safety check system operates when the vehicle is in said state to shut down the engine automatically if one of a second set of safeguard conditions occurs, the second set of safeguard conditions including that the time delay has expired.

12 Claims, 2 Drawing Sheets

VEHICLE IGNITION SYSTEM CAPABLE OF CONTINUED ENGINE RUNNING AFTER REMOVAL OF IGNITION KEY

BACKGROUND OF THE INVENTION

This invention relates to a vehicle ignition system.

Conventionally a vehicle has a key which turns to different positions in a key cylinder to perform various functions. The normal sequence of ignition key positions is lock/ACC (ACCESSORIES)/ON/start.

PRIOR ART

The ignition key can be inserted in or removed from the cylinder only in the lock position. The battery is normally connected to provide power to a plurality of direct loads whatever the ignition key position, for example to operate locking, alarm, clock and sidelights. In the lock position the battery is normally automatically disconnected from providing power to indirect loads for example headlights, radio, and temperature control and/or fans.

In the ACC position the battery can provide power to the indirect loads but not to the ignition/fuel supply.

In the ON position the battery is connected to all the electrical functions apart from the starter motor so that once started this is also the engine on position. In the start position the key operates the starter motor. This is a spring loaded position and on release, the key returns to the ON position. At this time an interlock engages to prevent the cranking of a turning engine, by preventing the key from returning to 'start' position again unless it is first moved to lock position.

To switch the engine off, the key is turned from ON position to ACC. In recent times turning the key from ACC to lock to facilitate its removal requires the actuation of a safety override of either "push the key and turn" or "push an adjacent button and turn". The safety override may not be present.

It is not an uncommon practice for a driver to leave a vehicle unattended with the engine running and the key in the ignition cylinder. He may do this, for example, because he does not intend to leave the vehicle for long and does not wish to switch off and have to start again, or he wishes the engine and interior to warm up. Alternatively he may wish to leave the heating/air conditioning system on for his passengers and this requires the engine to run if it is to maintain temperature for any reasonable period.

SUMMARY OF THE INVENTION

An object of the present invention is to provide a vehicle ignition system which allows the key to be removed from the cylinder while leaving the engine running but which ensures that the car is undriveable in this state and safe from intruders and dangerous actions by passengers.

Accordingly in one aspect the invention provides a vehicle ignition system comprising a key and cylinder in which the key can be removed from the cylinder while the engine is running but which includes means for automatically disabling the car so that it cannot be driven or moved when in this state. Preferably the car includes means for stopping the engine a predetermined time after the key is removed.

In a preferred form the invention provides a vehicle ignition system comprising a key cylinder and key arranged such that the vehicle can be put in a state in which the key is removed from the cylinder leaving the engine running, the system including a first safety check system which prevents operation to said state unless one or more of a first set of conditions is met, a timer arranged to be automatically started to measure a predetermined time delay from removal of the key when the engine is running, a second safety check system which operates when the vehicle is in said state to shut down the engine automatically if one of a second set of conditions occurs, the second set of conditions including that the time delay has expired.

Preferably the removal of the key is arranged to automatically cause one or more of a third set of safety conditions to occur.

Preferably the first set of safeguard conditions includes any combination of the following:

parking brake is on, the vehicle is in park condition (when automatic) and a foot is on the brake, the vehicle is in neutral and no clutch is depressed (for non-automatic vehicles), the driver's door and window are closed, the engine is in idle rpm, no wheel/shaft rotation, no bodily motions.

The second set of safeguard conditions includes that the time delay has expired together with one or more of the following:

the engine is not running above idle rpm for more than a predetermined time period, bodily motion is detected, the alarm is activated, the parking brake is moved to off, a foot is placed on the brake, the vehicle is moved out of parked condition or the clutch is depressed, a gear lever, if present, is moved out of neutral, the vehicle becomes low on fuel or the battery becomes low.

The third set of conditions includes the start of the timer and enabling of an auto shutdown system and may include one or more of the following:

the lever is locked in park condition, the steering lock is enabled, the windows close, the doors lock, the lights are moved to an auto condition, the alarm is enabled.

The system will include a control unit comprising two sets of interconnected relay switches, the first of the set being movable between two positions dependent on whether or not the key is in or out of the ignition cylinder, and the second of the sets being movable between two positions dependent on whether or not any of the second set of conditions is operated when the engine is in said state.

BRIEF DESCRIPTION OF THE DRAWINGS

One embodiment of vehicle ignition system will now be described, by way of example only, with reference to the accompanying drawings of which.

DETAILED DESCRIPTION OF ONE EMBODIMENT

Figure 1:
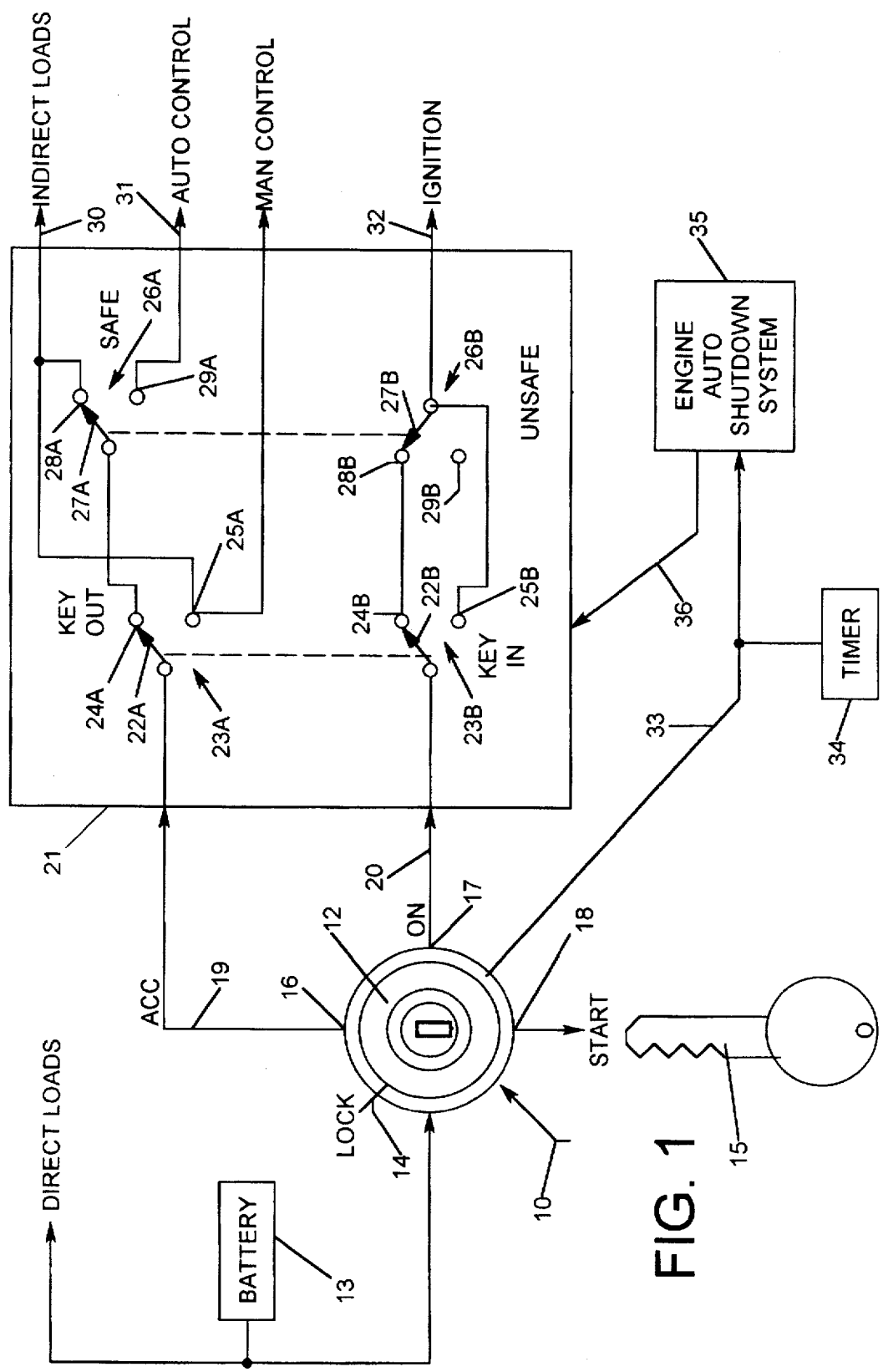
FIG. 1 is a diagrammatic view of an engine ignition and its electrical connections.

FIG. 1 shows an ignition cylinder 12 connected to a vehicle battery 13 which is also connected to supply power directly to direct loads such as the locking system, the alarm system, and the clock. The cylinder may have a conventional lock position 14 in which the battery is automatically disconnected from other functions and a key indicated at 15 may be removed from and inserted into the cylinder. As indicated the cylinder also has ACC, ON and START positions 16, 17 and 18 respectively and according to the invention the key can also be removed from the cylinder and reinserted when the cylinder is in the ACC and ON positions provided that a first set of conditions is present. A signal on line 10 can prevent the key removal if the first conditions are not met.

When the cylinder is in the ACC or ON position, the battery is connected via an ACC line 19 and an ON line 20 to a control unit 21.

The control unit includes a first set of relay switches 23A, 23B having switch members 22A, 22B which are respectively connected to lines 19 and 20 and arranged to be connected to first contacts 24A, 24B when the key is out and to second contacts 25A, 25B when the key is in. The control unit has a second set of relay switches 26A, 26B having switch members 27A, 27B normally connected to first contacts 28A, 28B (when the system regards the vehicle state as safe) and switched to engage second contacts 29A, 29B when a disable signal is generated on line 36 because the system regards the vehicle as unsafe. The contact 24A is connected to the switch member 27A. The contacts 25A and 28A are connected to a manual control system (MAN) and to indirect electric loads via line 30. The contact 29A is connected to an AUTO CONTROL via line 31. Contact 24B is connected to the contact 28A with the switch member 27A connected to supply power on line 32 to the ignition/fuel circuit of the engine. The contact 25B is also connected to the switch member 27A and thus to the ignition/fuel circuit.

The ignition cylinder is arranged to prevent removal of the key from the cylinder if one or a combination of any of the following first safeguard conditions are not present:

parking brake SET, for automatic cars, gear lever at PARK, for manual cars, lever at NEUTRAL and clutch NOT depressed, key override (if present) selected, to enable key removal, NO shaft rotation (gearbox output shaft), NO wheel rotation (any road wheel), NO bodily movement (translation), engine at 'IDLE rpm', foot ON-BRAKE pedal to ensure the driver is in the car, driver's door and window CLOSED, to further prevent anyone from just reaching in and removing the key without authority, any other.

The above may influence the key cylinder mechanically or electromechanically and/or provide discrete signals to the electronic control unit for the purpose of controlling the engine and systems.

A check-list of outstanding items may be provided in electronic form, to aid the driver in setting the required conditions, but need not form part of the safeguards. Pushing a button to call the 'set-up' page, may also initiate some tasks such as the closing of the driver's window.

'Page' items should erase in 'real time' as they are accomplished.

Once the safeguard requirements are satisfied, it should then be possible to remove the key from the cylinder. The actual removal of the key from its cylinder will provide a 'key out' signal on line 33 which will:

maintain the engine and systems running, enable the steering lock system, such that it is ready to engage if the steering wheel is turned, start an adjustable timer 34 to guard against open-ended operation, activate the locking system such that (a) doors lock, (b) windows close, enable the alarm system such that it activates on demand, allow any door to be opened from the inside without activating the alarm and automatically lock that door upon closing, allow any window to be opened without activating the alarm and optionally close it automatically on timer command, allow external access to the car via the remote locking system or manual 'key unlock', with automatic timer re-lock, if already ON, the external lights may enter an automatic mode that allows the sidelights to remain ON until a minimum battery level is reached (sufficient for engine starting), Activate an engine auto shutdown system 35, which will operate if:

A. alarm system activates,

B. parking brake released,

C. fuel low warning activates,

D. timer delay expires,

E. for manual cars, clutch pedal depressed or lever out of NEUTRAL,

F. for automatic cars, brake pedal depressed or lever out of PARK,

G. RPM NOT idle, (if desired, with time-delay transient protection for this and other safeguards), H. shaft rotates, I. wheel rotates, J. bodily motion detected.

In addition, the following systems should be immobilised;

K. starter,

L. ignition,

M. engine management

N. fuel.

In the event of engine stoppage due to auto shutdown enabled or other fault:

A. systems will power-down in an orderly manner, so as to preserve battery power, B. windows should close and doors be confirmed locked, C. a lock-out circuit shall disable the car even if the violation clears, D. an indication as to the cause of the shut-down shall be provided, E. for certain violations (such as alarm activation) the driver could be alerted via 'pager' by auto-dialling in-car telephone.

To facilitate this invention, it is not significant how the key is removed from the cylinder, so long as the desired function is achieved.

Various methods of removing the key can be used:

direct from the ON position by actuating the key override device, once the safeguards are satisfied, normal operation can be restored by simply re-inserting the key in the cylinder without turning, if the steering lock had engaged, the key will go only part way in, release the lock and push fully home, if unauthorised engine shutdown occurred, turn the key to LOCK and start again, via the LOCK position, (if there is a means for turning to LOCK without switching off the engine) after the desired function has been engaged by some manual selection (this must not nullify the interlock described on page 1), to restore normal operation, insert the key and turn to ON, via the START position, after the actuation of a manual override facility, that also disables the engine crank function associated with that position, to restore normal operation, insert the key and turn to ON, at present no safety override exists for turning the key from ON to ACC but such an override could be included, to guard against involuntary engine switch off, via any other safeguard position, existing or new Existing cars already generate and detect the majority of the signals required to operate the above system.

With such a system the car can be left undriveable and safe from intruders even with the engine running. This capability will enable a driver to start his car on say a cold winters morning and retreat indoors while the engine is warming up and the climate control system sorts out the cabin environment. The vehicle can also be left unattended for brief periods during the course of the day, possibly to post a letter, make a delivery, escort someone home, change a flat tire or use a phone box with the engine and other systems running so reducing wear and tear through start/stops and minimising those exhaust gases associated with "cold" engine and catalyst operation.

Figure 2:
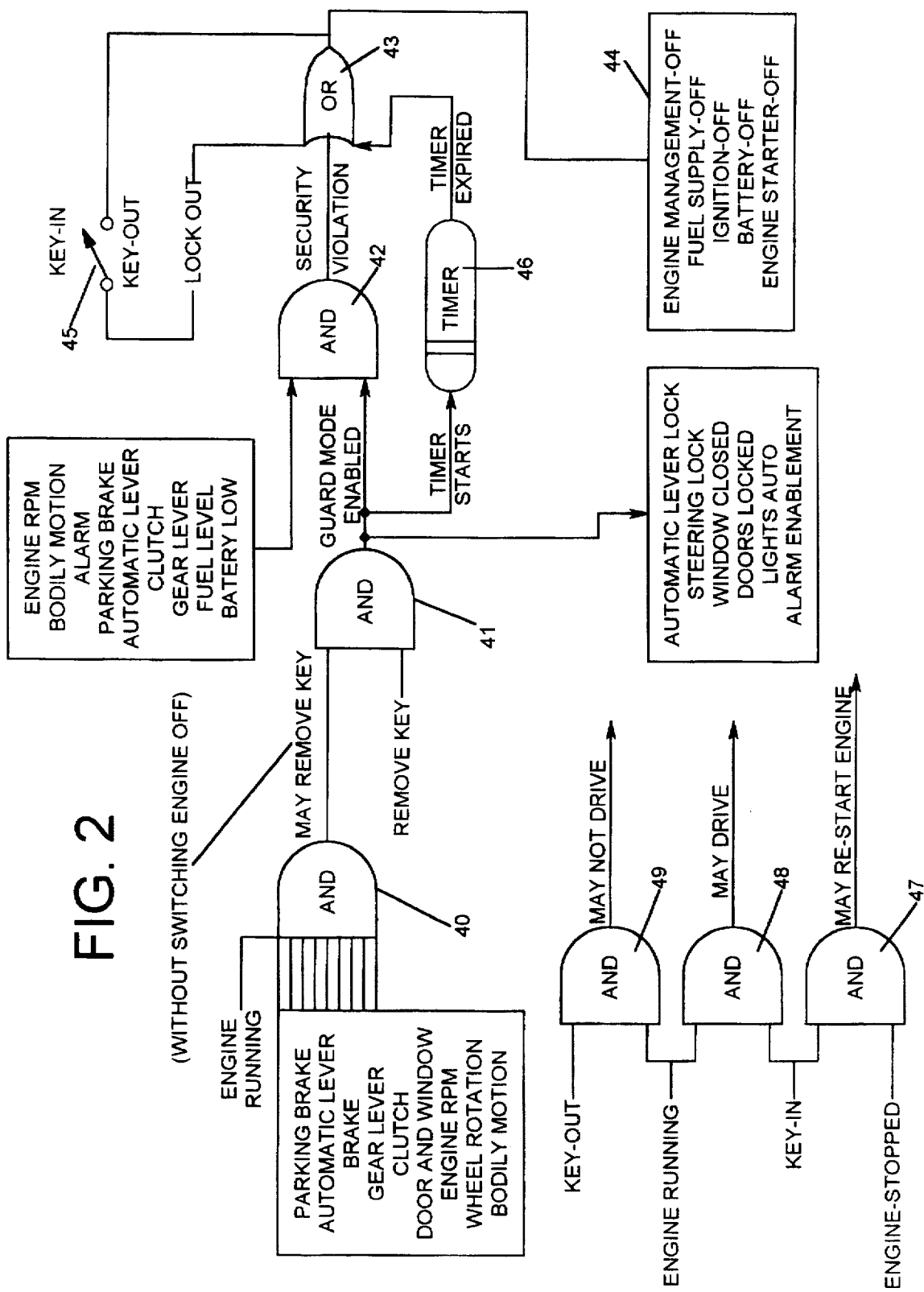
FIG. 2 shows various conditions and AND gates for normal operation and auto shutdown operation.

FIG. 2 shows graphically the functional performance of the system. A first AND gate 40 will allow removal of the key if the required conditions (lever at park, no shaft rotation, no wheel rotation and no bodily motion) are met. If the key is then removed a second AND gate 41 enables the guard mode (timer 46 starts, alarm enabled, shut-down mode armed, windows closed, lever locks in park, steering lock enabled). On any violation (shaft rotation, wheel rotation, bodily motion, low on fuel, engine stalled, alarm activated) a third AND gate 42 sends a signal to an OR gate 43 which acts on line 44 to shut the system down. The system shut-down involves engine management disabled, starter disabled, ignition disabled, fuel supply disabled, prop-shaft clamped, orderly system shut-down, doors confirmed locked, windows confirmed closed and shut-down systems lock-out. The OR gate 43 will also issue a shut-down signal if the time delay expires. When the key is in, switch 45 opens to disable the OR gate.

A further AND gate 48 allows normal operation when the key is in and the engine running. A further AND gate 47 allows the engine to be restarted if the key is in and the engine stopped.

A further AND gate 49 disables the transmission when the engine is running and the key is removed.

In this specification the term "key" should be interpreted to include a mechanical or electronic activator and the term "cylinder" to include any recipient device which interprets the commands of the activator.

What I claim is:

1. In a vehicle having an engine, an ignition system comprising a cylinder and a key movable in the cylinder between an engine running position and an engine off position, the key being insertable into and removable from the cylinder both in the engine off position and in the engine running position, and including first disabling means for automatically disabling the vehicle so that it cannot be driven when the key is removed from the cylinder in the engine running position.

2. A vehicle ignition system according to claim 1 in which the key can turn in the cylinder between four different positions, the four positions corresponding to a) a locked engine off position in which a battery is connected only to indirect loads, b) an ACC engine off position in which the battery is connected to direct and indirect loads, c) an on position in which the battery is connected to all vehicle electrical functions apart from a starter motor, and d) a start position in which the battery operates an engine starter motor, the key being removable from the cylinder in the on position.

3. A system according to claim 1 including a second disabling means including a timer for stopping the engine a predetermined time after the key is removed with the engine running and means for automatically setting the timer when the key is removed from the cylinder in the engine running position.

4. A system according to claim 1 including a first safety check system which prevents the key from being removed in the engine running position unless a first set of safeguard conditions is met, and in which the first set of safeguard conditions includes at least four of the following:

a) a parking brake is on, b) the vehicle is in a parked condition (for automatic gears) and a foot is on the brake, c) the vehicle has a gear lever in neutral and a clutch which is not depressed (for non-automatic vehicles), d) the vehicles has a driver's side door and window which are closed, e) the engine is in idle RPM, f) the vehicle has wheels which are not rotating, g) there are no bodily motions in the vehicle.

5. A vehicle ignition system according to claim 4 including a timer, timer initiation means arranged to be automatically started by the removal of the key from the cylinder in the engine running position, the timer being arranged to measure a predetermined time delay from the time of removal of the key, and in which the first disabling means includes a second safety check system operable when the key has been removed from the cylinder in the engine running position to shut down the engine automatically if one of a second set of safeguard conditions occurs, the second set of safeguard conditions including that the time delay has expired and including at least four of the following conditions in addition to the expiry of the time delay;

h) the engine is not running above idle RPM for more than a predetermined time period, i) bodily motion is detected, j) the vehicle has an alarm which is activated, k) the vehicle has a parking brake which is moved to off, l) the vehicle has a brake which is depressed, m) the vehicle is moved out of a parked condition or has a clutch which is depressed, n) the vehicle has a gear lever which is moved out of neutral position, and o) the vehicle has a fuel or battery which becomes low.

6. A system according to claim 5 in which the removal of the key from the cylinder in the engine running position is arranged to automatically cause enabling of an auto shut-down system and at least one of the following third set of safeguard conditions to occur:

p) the vehicle has a lever which is locked in a parked condition, q) the vehicle has a steering lock which is enabled, r) the vehicle has windows which close, s) the vehicle has doors which lock, t) the vehicle has lights which are moved to an auto condition, and u) the vehicle has an alarm which is enabled.

7. A system according to claim 6 in which when one of the second set of safeguard conditions is met and the auto shut-down system is put into operation, the auto shut-down system being arranged to ensure the disablement of at least one of the following:

v) an engine management system, w) fuel supply and ignition, x) battery connections to all loads except to direct loads, and y) ability to start engine even if violation ceases.

8. In a vehicle having an engine, an ignition system comprising a key cylinder and a key arranged such that the vehicle can be put in a state in which the key is removed from the cylinder leaving the engine running, the system including a first safety check system which prevents the vehicle from being put into said state unless a first set of safeguard conditions is met, the first set of safeguard conditions comprising at least four of the following:

a) a parking brake is on, b) the vehicle is in a parked condition (for automatic gears) and a foot is on the brake, c) the vehicle has a gear lever in neutral and a clutch which is not depressed (for non-automatic vehicles), d) the vehicle has a driver's side door and window which are closed, e) the engine is in idle RPM, f) the vehicle has wheels which are not rotating, and g) there are no bodily motions in the vehicle;

the system further comprising a timer, timer initiation means arranged to be automatically started by the removal of the key from the cylinder when the engine is running, the timer being arranged to measure a predetermined time delay from the time of removal of the key, and a second safety check system operable when the vehicle is in said state to shut down the engine automatically if one of a second set of safeguard conditions occurs, the second set of safeguard conditions including that the time delay has expired.

9. A system according to claim 8 in which the second set of safeguard conditions includes at least five of the following in addition to the expiry of the time delay:

h) the engine is not running above idle RPM for more than a predetermined time period, i) bodily motion is detected, j) the vehicle has an alarm which is activated, k) the vehicle has a parking brake which is moved to off, l) the vehicle has a brake which is depressed, m) the vehicle is moved out of a parked condition or has a clutch which is depressed, n) the vehicle has a gear lever which is moved out of a neutral position, and o) the vehicle has a fuel or battery which becomes low.

10. A system according to claim 9 in which the removal of the key in said state is arranged to automatically cause enabling of an auto shut-down system and at least one of the following third set of safeguard conditions to occur:

p) the vehicle has a lever which is locked in a parked condition, q) the vehicle has a steering lock which is enabled, r) the vehicle has windows which close, s) the vehicle has doors which lock, t) the vehicle has lights which are moved to an auto condition, and u) the vehicle has an alarm which is enabled.

11. A system according to claim 10 in which when one of the second set of safeguard conditions is met and the auto shut-down system is put into operation, the auto shut-down system being arranged to ensure the disablement of at least one of the following:

v) an engine management system, w) fuel supply and ignition, x) battery connections to all loads expect to direct loads, and y) ability to start engine even if violation ceases.

12. A system according to claim 8 including a control unit comprising two sets of interconnected relay switches, the first of the sets being movable between two positions dependent on whether or not the key is in or out of the ignition cylinder, and the second of the sets being movable between two positions dependent on whether or not any of the second set of safeguard conditions is met when the engine is in said state.

* * * * *